(12) United States Patent
Matsuura et al.

(10) Patent No.: US 6,336,746 B1
(45) Date of Patent: Jan. 8, 2002

(54) STRUCTURE FOR SUPPORTING ROTARY SHAFT

(75) Inventors: Masayuki Matsuura; Yukio Murai, both of Chiyoda-ku; Mitsuru Hatanaka; Takashi Fujimoto, both of Matudo, all of (JP)

(73) Assignee: Hitachi Plant Engineering & Construction Co., Ltd., Tokyo (JP)

( * ) Notice: Subject to any disclaimer, the term of this patent is extended or adjusted under 35 U.S.C. 154(b) by 0 days.

(21) Appl. No.: 09/592,293

(22) Filed: Jun. 12, 2000

(30) Foreign Application Priority Data

Aug. 31, 1999 (JP) .......................................... 11-245860

(51) Int. Cl.$^7$ .............................................. F16C 33/78
(52) U.S. Cl. ........................... 384/484; 384/477; 62/71; 222/49
(58) Field of Search ................................ 384/484, 477, 384/486; 62/71; 222/49

(56) References Cited

U.S. PATENT DOCUMENTS

| 4,886,189 A | * 12/1989 | Vanderjagt ................... 222/49 |
|---|---|---|
| 5,953,924 A | * 9/1999 | Li et al. ....................... 62/71 |

FOREIGN PATENT DOCUMENTS

| JP | 9-267115 A | 10/1997 |
|---|---|---|
| WO | 4444719 A | 6/1996 |

* cited by examiner

Primary Examiner—Lenard A. Footland
(74) Attorney, Agent, or Firm—Oliff & Berridge, PLC

(57) ABSTRACT

A rotary shaft is inserted to a tank through a hole formed in a wall of the tank. A casing is provided outside the tank, and the rotary shaft is supported by a bearing arranged in the casing. The casing is watertightly connected to the wall including the hole through a flexible joint. Seal members are arranged in the casing to seal the clearance between the rotary shaft and the casing. A sleeve is fitted on the rotary shaft so that the sleeve is watertightly in contact with at least one of the seal members, and the sleeve can be moved along the rotary shaft to change the seal member in contact with the sleeve. The bearing and the seal member are not affected by the deformation of the tank since the flexible joint connects the tank and the casing, and the rotary shaft can rotate smoothly while securing high sealing quality. The alignment of the axes of the bearing and the hole in the tank can be easy since the bearing is provided outside of the tank, and thus assembly and maintenance of the structure are easy. The tank can have relatively low strength since the tank has not to support the rotary shaft with the bearing; thus the structure can be compact and the cost can be reduced.

3 Claims, 3 Drawing Sheets

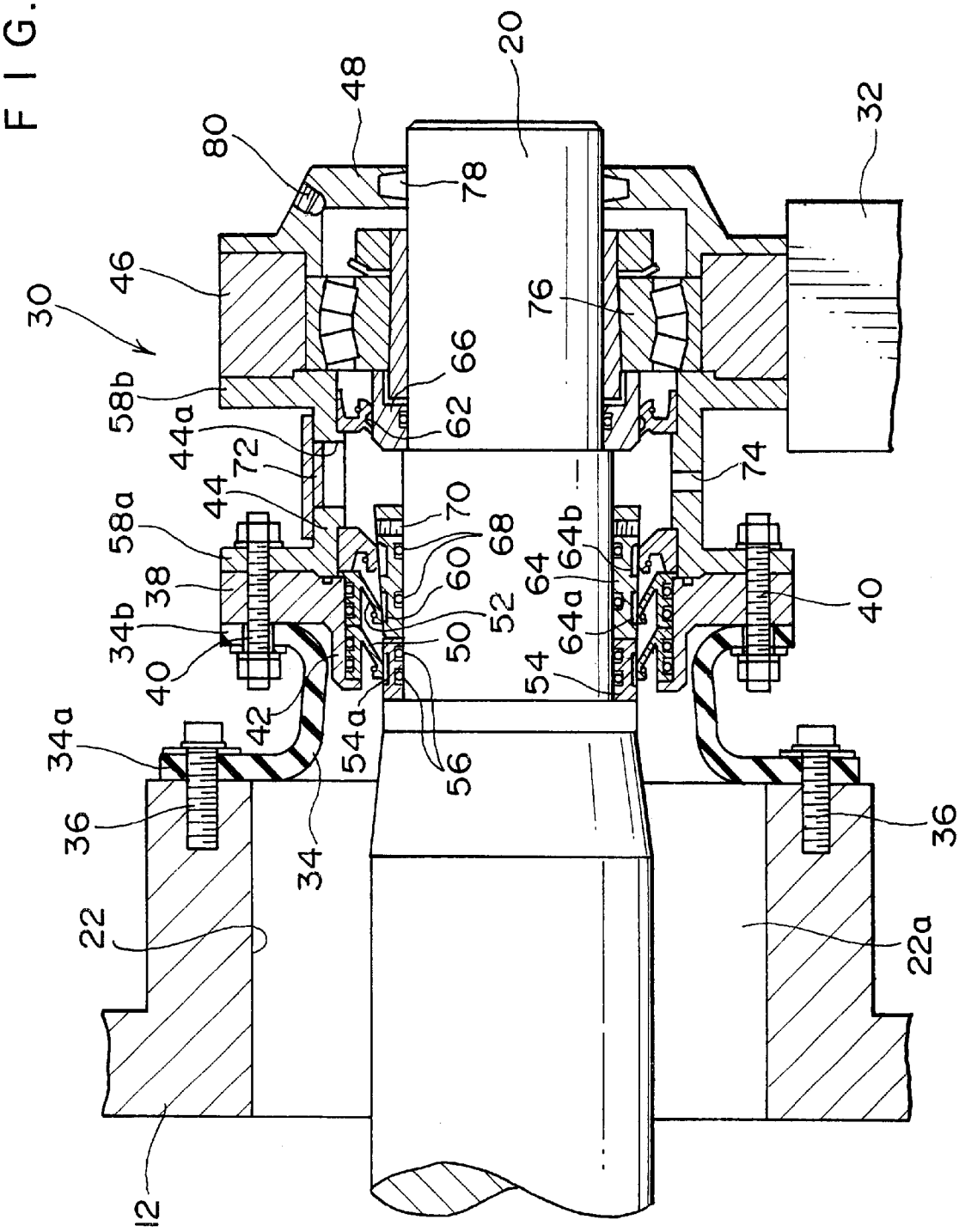

STRUCTURE FOR SUPPORTING ROTARY SHAFT

BACKGROUND OF THE INVENTION

1. Field of the Invention

The present invention relates generally to a structure for supporting a rotary shaft, more specifically to the structure for supporting a rotary shaft that is inserted in a liquid tank through a wall thereof.

2. Description of Related Art

In some apparatus such as a rotary flat membrane separation apparatus, a rotary shaft is inserted in a tank, which holds a liquid, from outside through holes formed in opposite walls of the tank. Conventionally, bearings for supporting the rotary shaft are directly fixed in the holes in the walls. However, if the distance between the opposite walls is long in this structure, it is difficult to accurately align the axes of the bearings in the holes with each other. The structure is thus difficult to construct and maintain. Moreover, if the tank is deformed due to the weight of the liquid in the tank, the axes of the bearings are diverged, so that the rotary shaft supported by the bearings cannot smoothly rotate and the liquid can leak out through seal parts around the holes. Furthermore, the walls of the tank must be strong to support the rotary shaft with the bearings, which are directly fixed in the holes in the walls, and such the structure would increase both size and cost of the apparatus.

SUMMARY OF THE INVENTION

The present invention has been developed in view of the above-described circumstances, and has as its object the provision of the structure for supporting the rotary shaft that has a simple structure and has a high sealing quality.

In order to achieve the above-described object, the present invention is directed to rotary shaft supporting structure, comprising: a rotary shaft which is inserted to a liquid tank through a pair of openings formed in a pair of opposite walls of the liquid tank with a predetermined clearance between the rotary shaft and an edge of each of the pair of opposite walls of the liquid tank defining each of the pair of openings; a bearing member which supports the rotary shaft, the bearing member being arranged outside the liquid tank; a tubular casing which contains the bearing member; a seal part which is provided in the casing to seal the clearance between the rotary shaft and the casing; and a joint which watertightly and flexibly connects the casing to the opening in the wall of the liquid tank.

According to the present invention, the rotary shaft is inserted to the liquid tank through the holes in the walls of the liquid tank with a predetermined clearance, and is supported by the bearing member arranged outside the liquid tank. Thus, the hole and the bearing member are easily aligned, and also construction and maintenance of the structure are easy. Moreover, the seal part is provided separately from the liquid tank and is arranged in the casing; thus the alignment of the seal part is easy and simple. Further, since the bearing member and the seal part are arranged separately from the liquid tank, they are not affected by the deformation of the liquid tank. Therefore, the rotary shaft can always rotate smoothly while securing extremely high sealing quality. Furthermore, the liquid tank can have relatively low strength since the liquid tank has not to support the rotary shaft with the bearing member; thus the structure can be compact and the cost can be reduced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a front sectional view showing the structure for supporting the rotary shaft in which a primary seal has been abraded.

DESCRIPTION OF THE PREFERRED EMBODIMENT

This invention will be described in further detail by way of example with reference to the accompanying drawings. The explanation will be given in a case that the present invention is applied to a rotary flat membrane separation apparatus, which separates and concentrates suspension in a liquid and is used especially for separating activated sludge and condensed sludge, and concentrating the sludge in the treatment of sewage.

Figure 1:
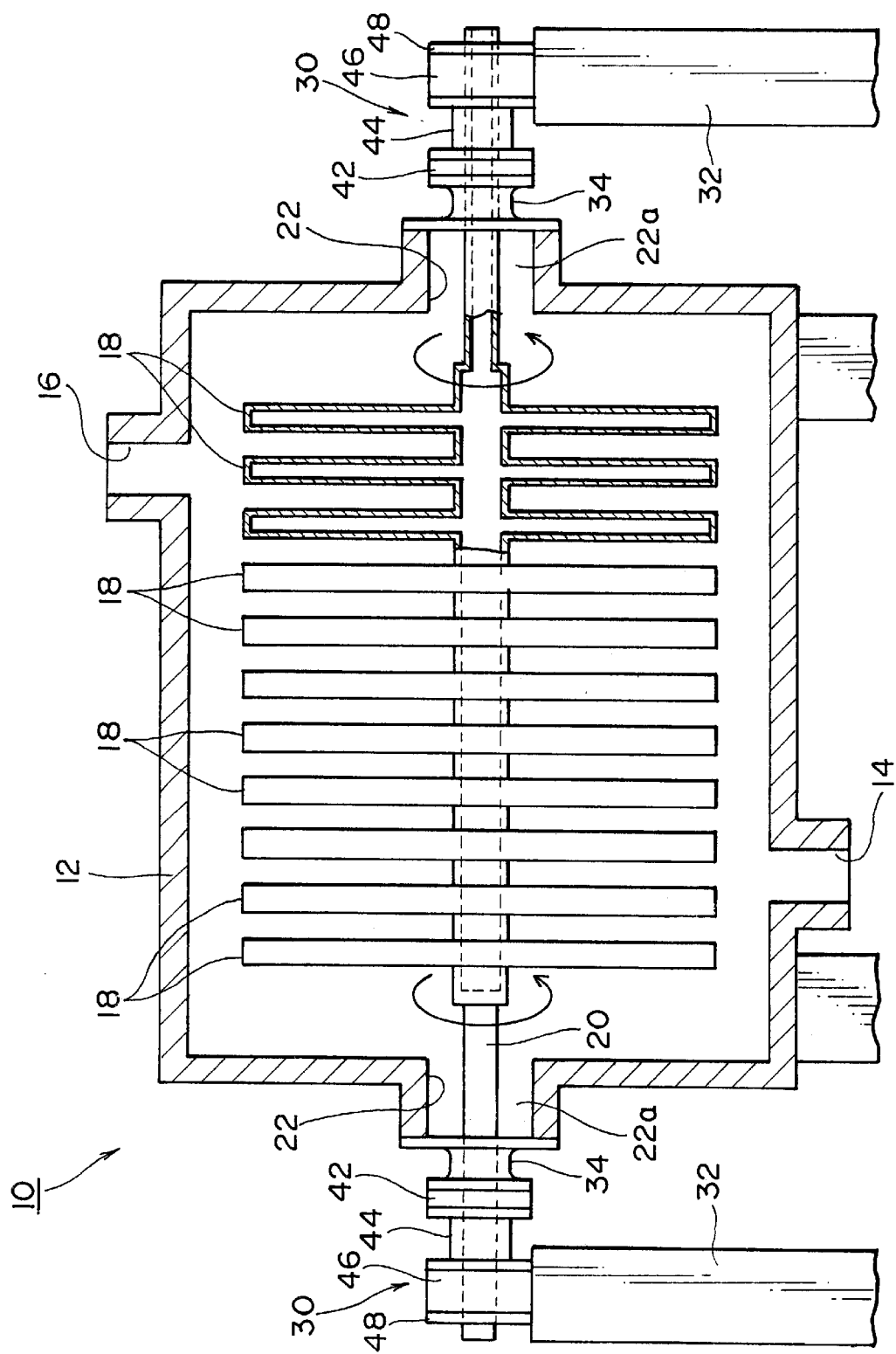
FIG. 1 is an explanation view of a rotary flat membrane separation apparatus including a structure for supporting a rotary shaft according to an embodiment of the present invention.

FIG. 1 is a side view showing the structure of the rotary flat membrane separation apparatus 10. The rotary flat membrane separation apparatus 10 includes a cylindrical filter tank 12, which has an inlet 14 formed at the bottom and an outlet 16 formed at the top. A liquid to be treated is supplied into the filter tank 12 through the inlet 14, and the concentrated liquid is discharged through the outlet 16.

A plurality of filter boards 18 are disposed inside the filter tank 12 with constant intervals with each other. The filter boards 18 are disk-shaped and hollow, and are attached to a rotary shaft 20, which is hollow. Each hollow of the filter board 18 communicates with the hollow of the rotary shaft 20 through an aperture formed at the connection. The rotary shaft 20 is arranged in the filter tank 12, and both ends of the rotary shaft 20 project from the filter tank 12 through holes 22, which are formed at both sides of the filter tank 12, with predetermined clearances 22a. Both ends of the rotary shaft 20 are supported by support parts provided outside the filter tank 12. One end of the rotary shaft 20 is operatively connected with a motor (not shown) for rotating the rotary shaft 20. The present invention is applied to the support parts of the rotary shaft 20, and the structure of the support parts will be described later in detail.

In the rotary flat membrane separation apparatus 10, when the liquid to be treated is supplied into the filter tank 12 through the inlet 14 and the rotary shaft 20 is rotated, substances such as suspension included in the liquid is removed by the filter boards 18, and the filtrated liquid is passed through the filter boards 18 into the hollows of the filter boards 18 and is discharged through the hollow of the rotary shaft 20 to the outside of the filter tank 12. Then, the liquid in which the suspension is concentrated is discharged through the outlet 16 to the outside of the filter tank 12.

Next, the structure of the support parts of the rotary shaft 20, to which the present invention is applied, will be described. The structure of the support parts at both ends of the rotary shaft 20 is the identical; thus one of the support parts at the right side in FIG. 1 will be described.

Figure 2:
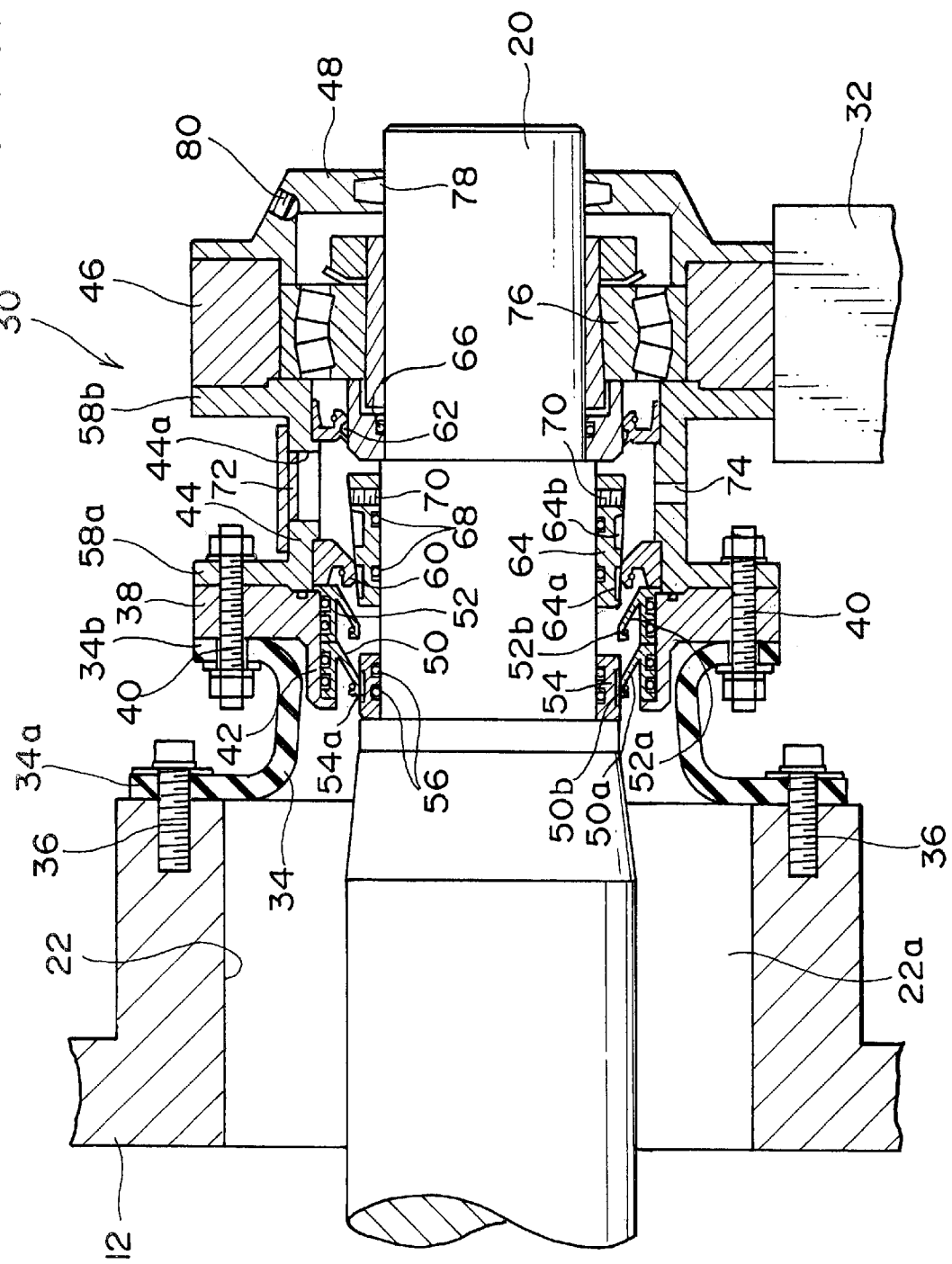
FIG. 2 is a front sectional view showing the structure for supporting the rotary shaft in FIG. 1.

FIG. 2 is a front sectional view showing the structure of the support part of the rotary shaft 20. As shown in FIG. 2, a cylindrical casing 30 is arranged outside the filter tank 12. The casing 30 is mounted on a base 32 provided outside the filter tank 12, and is arranged substantially coaxially with the hole 22 formed in the filter tank 12.

The casing 30 is watertightly connected to the hole 22 through a cylindrical joint 34, which is made of rubber. The joint 34 has flanges 34a and 34b, which are secured with bolts 36 and 40 to the end face of the hole 22 and a flange 38 formed on the casing 30, respectively.

The rotary shaft 20 is inserted inside the casing 30. The casing 30 comprises a primary seal casing 42, a secondary seal casing 44, a bearing casing 46, and a bearing cap 48, which are connected to each other with bolts (not shown).

The primary seal casing 42 is a cylinder having the flange 38 at its end, and a primary seal 50 and a reserve seal 52 are arranged along the axis of the primary seal casing 42. The primary seal 50 and the reserve seal 52 are identical in structure, and have lips 50a and 52a made of polytetrafluoroethylene (PTFE). The lips 50a and 52a are pushed towards the center by springs 50b and 52b made of corrosion-resisting metal. The lips 50a and 52a are pressed against the seal face by elasticity of the metal springs 50b and 52b and by the pressure of the liquid to be treated, whereby the shutting of the liquid is secured.

The primary seal 50, which is the left one of the two seal members 50 and 52 in FIG. 2, slides on a contact part 54a formed on the outer periphery of a primary sleeve 54, which is fitted on the rotary shaft 20. The contact part 54a is made of stellite. O-rings 56 are provided between the primary sleeve 54 and the rotary shaft 20.

The secondary seal casing 44 is a cylinder having flanges 58a and 58b at both ends. The flange 58a is connected to the flange 38 formed on the primary seal casing 42 with the bolts 40. Inside the secondary seal casing 44, a secondary seal 60 and an oil seal 62 are arranged at the left and right ends in FIG. 2, respectively. The secondary seal 60 is made of rubber (e.g., nitrile-butadiene rubber (NBR)). The secondary seal 60 slides on the outer periphery of a secondary sleeve 64, which is fitted on the rotary shaft 20, thereby the clearance between the casing 30 and the rotary shaft 20 is sealed. The oil seal 62 slides on the outer periphery of a collar 66, which is fitted on the rotary shaft 20, thereby the clearance between the casing 30 and the rotary shaft 20 is sealed.

O-rings 68 are provided between the secondary sleeve 64 and the rotary shaft 20. The secondary sleeve 64 is slidable along the rotary shaft 20, and is fixable at a desired position with setscrews 70. The secondary sleeve 64 has an outer periphery tapered off to the left end in FIG. 2. The secondary sleeve 64 has contact parts 64a and 64b, where the outer periphery of the secondary sleeve 64 is covered with stellite, arranged with a predetermined interval on the outer periphery of the secondary sleeve 64.

When the primary seal 50 is not abraded, the secondary sleeve 64 is set at a position where the left contact part 64a is in contact with the secondary seal 60. In this state, the clearance between the casing 30 and the rotary shaft 20 is sealed at two points by the primary seal 50 and the secondary seal 60.

When the primary seal 50 becomes abraded, the secondary sleeve 64 is moved to a position where the left contact part 64a is in contact with the reserve seal 52 as shown in FIG. 3. In this state, the reserve seal 52 slides on the left contact part 64a, and the secondary seal 60 slides on the right contact part 64b. Thus, the clearance between the casing 30 and the rotary shaft 20 is sealed at two points by the reserve seal 52 and the secondary seal 60. Since the diameter of the secondary sleeve 64 is extended to the right end, in other words, since the diameter of the right contact part 64b is larger than that of the left contact part 64a, the secondary seal 60 can be securely in contact with the contact part 64b and an extremely high sealing quality can be thereby maintained even though the secondary seal 60 is abraded.

As described above, by providing the reserve seal 52 in addition to the primary seal 50, necessity to disassemble the casing 30 and exchange the seal members can be reduced, and the maintenance is thus easy.

To move the secondary sleeve 64, a lid 72 attached to an opening 44a formed in the secondary seal casing 44 is taken off, and a tool such as a screwdriver is inserted through the opening 44a to loosen the setscrews 70, then the secondary sleeve 64 is moved. After moving the secondary sleeve 64, the setscrews 70 are tightened again, and the lid 72 is attached to the opening 44a.

The secondary seal casing 44 has a drain hole 74 formed at the bottom, and abrading condition of the seal members can be determined by detecting leakage of the liquid from the drain hole 74.

The bearing casing 46 is annular and is connected to the flange 58b of the secondary seal casing 44 with bolts (not shown). A bearing 76 is arranged in the bearing casing 46, and the rotary shaft 20 is supported by the bearing 76. The bearing cap 48 is attached to the bearing casing 46 with bolts (not shown) so as to shield the end of the bearing casing 46. An inner periphery 78 of the annular bearing cap 48 has a labyrinth structure. The inside of the bearing casing 46, which is sealed by the bearing cap 48 and the oil seal 62, is filled with grease injected through a grease inlet 80 formed in the bearing cap 48.

An explanation will be given to the operation of the above-described structure for supporting the rotary shaft 20 according to the embodiment of the present invention.

As shown in FIG. 2, the clearance between the casing 30 and the rotary shaft 20 is sealed at the two points by the primary seal 50 and the secondary seal 60, respectively, thereby improving sealing quality.

When the liquid to be treated is filled into the filter tank 12, the filter tank 12 may be deformed due to the weight of the liquid. The bearing 76 is arranged separately from the filter tank 12 in the present embodiment so that the bearing 76 is not affected by the deformation of the filter tank 12; thus the rotary shaft 20 can always rotate smoothly despite the deformation of the filter tank 12. Similarly, since the seal part is arranged separately from the filter tank 12, the seal part is not affected by the deformation of the filter tank 12, and high sealing quality is always secured.

Advantageously, providing the bearing 76 and the seal member separately from the filter tank 12 makes assembly of the apparatus easy. If the bearing is directly fixed in the hole in the filter tank as the conventional apparatus, it is required to align together the axis of the rotary shaft supported by the bearing, the axis of the seal member and the axis of the hole, and this operation is extremely difficult. In the present embodiment, since the bearing 76 and the seal member are arranged separately from the filter tank 12, it is not required to strictly align the axis of the hole 22 and the axis of the rotary shaft 20, that is, a rough alignment is acceptable. Moreover, the alignment between the axis of the seal member and the axis of the rotary shaft 20 can be easily performed since every seal member is provided in proximity of the bearing 76. Consequently, assembly, construction, and maintenance of the apparatus according to the present embodiment are easy. Furthermore, providing the bearing 76 and the seal member separately from the filter tank 12 also allows the filter tank 12 to have relatively low strength since the filter tank 12 has not to support the rotary shaft 20 with the bearing 76; thus the apparatus can be compact and the cost can be reduced.

If the primary seal 50 and the secondary seal 60 become abraded, the liquid to be treated begins to leak out. If the leaking liquid appears through the drain hole 74 formed in the casing 30, the operation of the apparatus is halted to shift the secondary sleeve 64 to use the reserve seal 52. As shown in FIG. 3, the secondary sleeve 64 is moved left to make the reserve seal 52 slide on the contact part 64a. By this operation, the clearance between the casing 30 and the rotary shaft 20 is sealed at two points by the reserve seal 52 and the secondary seal 60, which is made to slide on the contact part 64b. Since the diameter of the secondary sleeve 64 is extended to the right end, in other words, since the diameter of the right contact part 64b is larger than that of the left contact part 64a, the secondary sleeve 64 can maintain high sealing quality by securely touch the contact part 64b to the secondary seal 60 even though the secondary seal 60 is abraded.

As described before, providing the reserve seal 52 in addition to the primary seal 50 reduces the necessity to disassemble the casing 30 and exchange the seal members; thus the maintenance is easy.

As has been demonstrated, the structure for supporting the rotary shaft of the present embodiment can secure high sealing quality with a simple structure.

In the above-described embodiment, the structure for supporting the rotary shaft is applied to the rotary flat membrane separation apparatus; however, the present invention should not be restricted to this. The present invention may similarly be applied to any apparatus in which a rotary shaft is inserted to a tank containing liquid.

In the above-described embodiment, only one reserve seal 52 is provided; however, a plurality of reserve seals may be provided.

In the above-described embodiment, the joint 34 is made of rubber; however, any material with flexibility may be used.

In the above-described embodiment, the casing containing the seal members is connected with the bearing member through the casing containing the bearing member; however, the casing containing the seal members may be arranged separately from the bearing member.

As has been described above, according to the present invention, the bearing member and the seal member are arranged in the casing that is provided separately from the tank and that is connected to the tank through the flexible joint. Thus the bearing member and the seal member are not affected by the deformation of the tank, and the rotary shaft can rotate smoothly while securing high sealing quality. Moreover, since the bearing member is provided outside of the tank, the alignment of the axes of the bearing member and the hole in the tank, through which the rotary shaft is inserted to the tank, can be easy, and thus assembly and maintenance of the apparatus are easy. Furthermore, the tank can have relatively low strength since the tank has not to support the rotary shaft with the bearing; thus the apparatus can be compact and the cost can be reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary shaft supporting structure, comprising:

a rotary shaft which is inserted to a liquid tank through a pair of openings formed in a pair of opposite walls of the liquid tank with a predetermined clearance between the rotary shaft and an edge of each of the pair of opposite walls of the liquid tank defining each of the pair of openings;

a bearing member which supports the rotary shaft, the bearing member being arranged outside the liquid tank;

a tubular casing which contains the bearing member;

a seal part which is provided in the casing to seal the clearance between the rotary shaft and the casing; and a joint which watertightly and flexibly connects the casing to the opening in the wall of the liquid tank.

2. The rotary shaft supporting structure as defined in claim 1, wherein the seal part comprises:

a sleeve which is fitted on the rotary shaft;

a plurality of seal members which are provided in the casing to be in contact with an outer periphery of the sleeve to seal the clearance between the casing and the sleeve, wherein the sleeve is shifted to change the seal members in contact with the sleeve.

3. The rotary shaft supporting structure as defined in claim 2, wherein the outer periphery of the sleeve is tapered.

* * * * *

UNITED STATES PATENT AND TRADEMARK OFFICE
CERTIFICATE OF CORRECTION

PATENT NO. : 6,336,746 B1  Page 1 of 1
DATED : January 8, 2002
INVENTOR(S) : Masayuki Matsuuura et al.

It is certified that error appears in the above-identified patent and that said Letters Patent is hereby corrected as shown below:

<u>Title page,</u>
Item [56], References Cited, FOREIGN PATENT DOCUMENTS should read:
-- FOREIGN PATENT DOCUMENTS
JP      9-267115 A     10/1997
DE      4444719 A      6/1996 --

Signed and Sealed this

Eleventh Day of June, 2002

*Attest:*

*Attesting Officer*

JAMES E. ROGAN
*Director of the United States Patent and Trademark Office*